April 1, 1958 T. L. DIMOND 2,829,204
BATTERY CHARGING OVER SUBSCRIBER TELEPHONE LINE
Filed Nov. 26, 1954
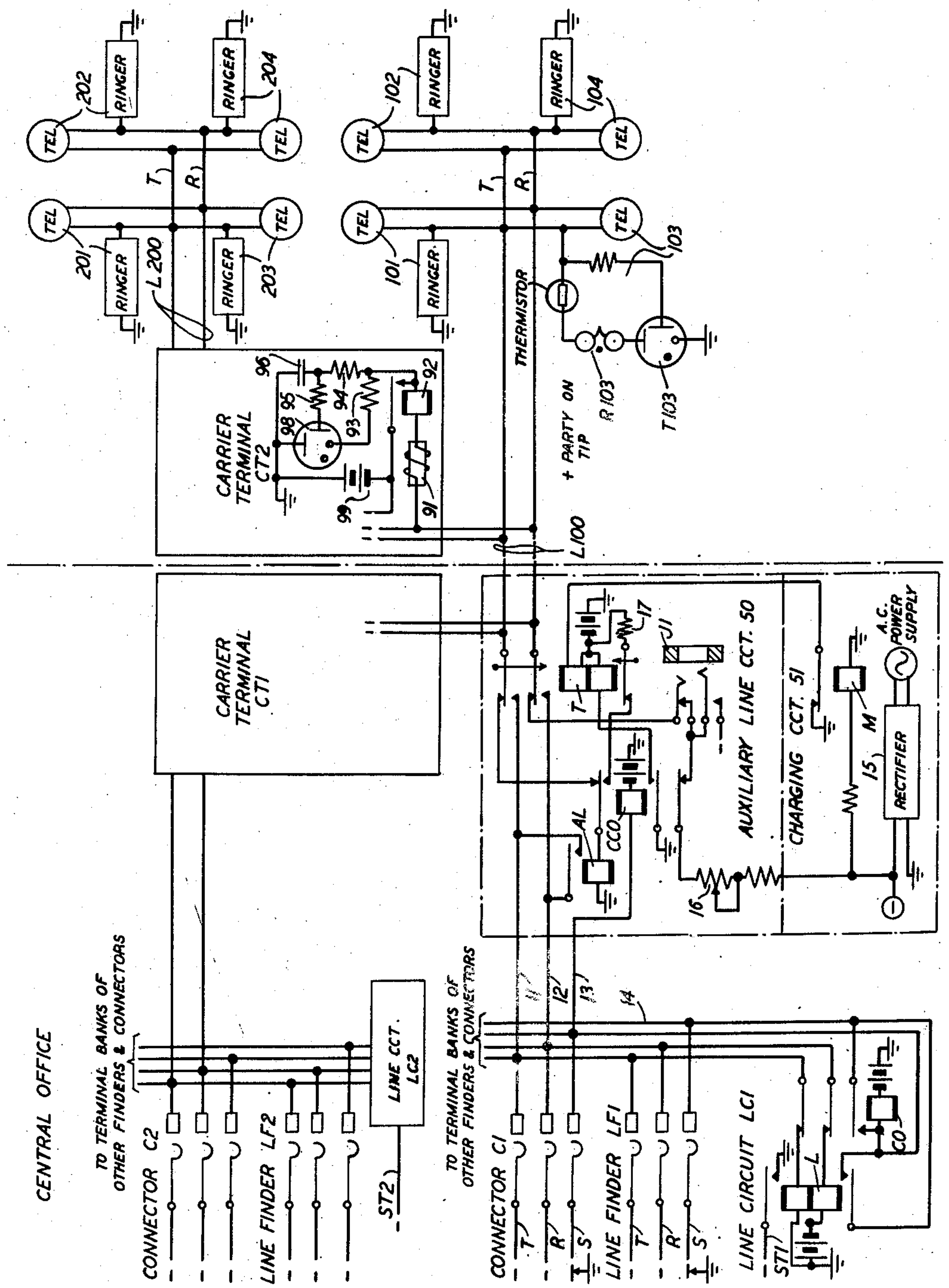
INVENTOR
T. L. DIMOND
BY R. D. Covell
ATTORNEY United States Patent Office 2,829,204

Patented Apr. 1, 1958

2,829,204

BATTERY CHARGING OVER SUBSCRIBER TELEPHONE LINE

Thomas L. Dimond, Rutherford, N. J., assignor to Bell Telephone Laboratories, Incorporated, New York, N. Y., a corporation of New York Application November 26, 1954, Serial No. 471,239

4 Claims. (Cl. 179—26)

This invention relates to telephone systems and particularly to systems including telephone equipment units remote from central offices, one or more of the units being located where no commercial power source is available for supplying the energy required for operating the unit.

In rural areas in which commercial power is available, the power line may be used to provide carrier telephone service. But in some rural areas there is no power line, in which case carrier telephone terminal units may be provided with primary batteries or be supplied with power over a line from the telephone central office. Another alternative is the provision of a storage battery at an outlying carrier terminal.

One object of the present invention is the use of a subscriber telephone line, which is connected to provide telephone service to and from both audio and carrier subscriber stations, for charging the storage battery of the carrier terminal during the time the audio channel over the line is in idle condition.

The invention involves an arrangement of apparatus and circuit means in a telephone system in combination with a subscriber line and central office switching means for using the line to charge a storage battery located at the remote end of the line without interfering with communication or signaling over the line.

A feature of the invention is the use of a telephone subscriber line, which is connected to provide two-way communication to one or more subscriber stations and to provide a carrier channel serving one or more additional subscriber stations, for charging a storage battery in the outlying carrier terminal from a power source in the central office in which this line terminates, without interfering with communication or signaling over the line.

A further feature of the invention is an auxiliary line circuit in a telephone central office associated with a subscriber line enabling use of the line while not in communication use for charging a storage battery at a remote point to which the line extends.

The drawing, which consists of a single figure, shows a telephone system embodying the invention and its features.

The invention is not limited in its application to the specific embodiment shown in the drawing but is generally applicable to any telephone system in which a power source at a central office is used to charge a battery at the remote end of a line.

The system represented schematically in the drawing comprises a telephone central office in which subscriber lines are interconnected by dial-controlled switching equipment. The switching equipment is represented by two line finder switches LF1 and LF2 and two connector switches C1 and C2. These switches may be of the well-known step-by-step type and reference may be had to pages 53 to 65 "Automatic Telephony" by Smith and Campbell, 2nd edition, published in 1920, for a description of the structure of such switches and their operation when employed as connectors. Reference may be had to Patent No. 1,799,654 to R. L. Stokely, granted April 7, 1931, for a description of the operation of such switches when employed as line finders. The line finder and connector switches are each represented by a set of brushes and a single set of line terminals, the associated operating magnets, relays and other circuit apparatus being omitted. The subscriber lines may be individual or party lines, the two lines L100 and L200 shown in the drawing being party lines, the line L100 having stations 101, 102, 103 and 104 connected thereto and the line L200 having stations 201, 202, 203 and 204 connected thereto. Each of these stations includes a telephone set and a ringer, the telephone set being of known type including a dial (not shown) for use in controlling the central office switching equipment to establish desired connections. The connectors are arranged to selectively transmit alternating ringing current superimposed on either positive or negative direct current to effect selective actuation of the ringer at any called station. Two of the stations on each line are signaled by transmitting signaling current over the tip conductor of the line and the other two stations are signaled by transmitting ringing current over the ring conductor of the line. The ringing equipment at each station includes a three element gas-filled tube controlling the operative energization of the ringer. The ringing equipment for the station 103, which is signaled by positive superimposed ringing current transmitted over conductor T of line L100, is shown as including the ringer R103 and gas-filled tube T103. A thermistor is connected in series with the ringer to prevent bell tapping each time battery charging potential is applied to line L100. Reference may be had to Patent No. 1,849,088, granted March 15, 1932, to H. Hovland, for a description of a connector arranged for four-party selective or eight-party semiselective ringing and to Patent No. 2,088,311, granted to L. J. Stacy July 27, 1937, for a description of the ringing equipment provided at the stations of a four-party line.

The conductors of line L100 constitute a two-way audio channel extending from subscriber stations 101, 102, 103 and 104 to the central office at which it is associated with an auxiliary line circuit 50, charging circuit 51 and line circuit LC1. The conductors of line L100 are also connected at the central office to a carrier terminal CT1 and therethrough with conductors of line circuit LC2; and the conductors of line L100 are further connected, at an outlying point, to a carrier terminal CT2 to which are also connected the conductors of line L200. A carrier channel is thereby provided over line L100 for two-way communication service between the central office and subscriber stations 201, 202, 203 and 204. While not shown in the drawing, a low-pass filter is inserted between auxiliary line circuit 50 and the conductors of line L100 to prevent the carrier currents from feeding into the voice conductors 11 and 12; and a low-pass filter is also inserted between each of stations 101, 102, 103 and 104 and the conductors of line L100.

The carrier terminals CT1 and CT2 may be similar to the office and outlying carrier terminals shown in Figs. 2, 3A and 3B of the application Serial No. 455,099, filed September 10, 1954, by V. J. Hawks, E. K. Van Tassel and D. C. Weller for a Rural Carrier Telephone Transmission System. It is to be noted, however, that the power source in the outlying terminal of the Hawks-Van Tassel-Weller application is a primary battery whereas the power source in carrier terminal CT2 is a storage battery 99 which requires charging.

The line circuits LC1 and LC2 are of usual type in dial telephone systems, the line circuit LC1 being shown in detail and the line circuit LC2 in block form. Each line circuit comprises a line relay and a cut-off relay. The auxiliary line circuit 50 is arranged to enable use of the line L100, when not in use on a call to or from any one of stations 101, 102, 103 and 104, to effect charging of the storage battery 99 in carrier terminal CT2, this battery being required for energizing equipment in the terminal and the telephones at stations 201, 202, 203 and 204. The auxiliary line circuit 50 includes an auxiliary line relay AL, a transfer relay T, and a charge cut-off relay CCO. The charging circuit 51 includes a direct-current power source, comprising rectifier 15, and an alarm relay M. The transfer relay T controls the connection of the winding of the auxiliary line relay to conductor T of line L100, controls the connection of the output voltage from rectifier 15 to conductor R of line L100, and controls the connection of conductors 11 and 12 of line circuit LC1 to the conductors of line L100.

Assume now that the audio channel over line L100 is idle, both the line relay L and cut-off relay CO of line circuit LC1 being non-operated. Under these conditions and with the power source providing the rated direct-current voltage, relay M is operated and the direct-current voltage across rectifier 15 is connected to line L100 to charge the battery 99 of carrier terminal CT2. This connection is traced from the negative terminal of rectifier 15, through potentiometer 16, a back contact of relay CCO, a normally closed contact of test jack J1, a back contact of relay T and lower conductor of line L100, to carrier terminal CT2 and therein through retard coil 91 and the winding of relay 92, thence through resistor 93 to the anode of tube 98, through resistors 94 and 95 to the control anode of tube 95, and through resistor 94 and capacitor 96 to ground potential. As capacitor 96 charges, the voltage drop therethrough increases until energization of gas tube 98 is initiated; whereupon the current through the winding of relay 92 and the main anode of tube 98 effects operation of relay 92. The capacitor 96 prevents energization of tube 98 responsive to the application of ringing voltage to line L100 and to other transient voltages including transients produced during transmission of dial pulses over line L100. With relay 92 operated, the direct-current connection from the negative terminal of rectifier 15 is extended to the negative pole of battery 99 thereby initiating charging of the battery. Relay 92 is held operated by the charging current, but gas tube 98 is deenergized.

If, while the battery 99 of carrier terminal CT2 is being charged, one of the subscribers connected directly to line L100 initiates a call by removing the telephone from the receiver hook, the auxiliary line relay AL is operatively energized in a circuit path extending from the lower conductor of line L100, through the telephone set at the calling one of stations 101, 102, 103 and 104, thence through the upper conductor of line L100 and back contacts of relays T and CCO, and through the winding of relay AL to ground. Relay AL operates, interconnecting conductors 11 and 12, thereby energizing both windings of line relay L. The operation of relay L connects ground to line finder start conductor ST1 to effect the operation of an idle finder having access to terminals to which conductors 11, 12 and 14 are connected. The operation of relay L further connects the winding of relay CO to conductor 14 to mark the terminal to which this conductor is connected in the banks of the finders in the group with which start conductor ST1 is associated. When the brushes of the line finder, which is started in operation, engage the terminals which are individual to the line L100, the cut-off relay CO is operated. Assuming line finder LF1 to be the finder in operation, the circuit for operating relay CO is traced from its winding through the lower front contact of relay L, conductor 14, S brush of line finder LF1 to ground. The operation of relay CO closes a holding circuit independent of relay L and causes the release of relay L by disconnecting its windings from conductors 11 and 12. The ground potential connected through the S brush of line finder LF1 to conductor 14 is further extended through the front contact of relay CO to conductor 13, thus operatively energizing the winding of relay CCO. The operation of relay CCO opens the charging circuit over the lower conductor of line L100, closes a circuit for operatively energizing the lower winding of relay T and closes a circuit including resistor 17 for holding relay AL operated until relay T has operated. The operation of relay T causes the release of relay AL and extends the conductors of line L100 to conductors 11 and 12, thence through the brushes of line finder LF1 to battery and ground potential supplied through relay windings of the various selectors and trunks (not shown) through which the desired connection is established under the control of the dial at the calling subscriber station. Relay T is slow in operating to insure the release of relay 92 and disconnection of battery 99 from the lower conductor of line L100 before the line L100 is connected to the line circuit LC1. Relay CO is held operated by ground potential connected to conductor 14 as long as this connection is maintained. When the telephone is replaced on the receiver hook at the calling station, the switches including line finder LF1 are restored to normal, and ground is disconnected from conductors 14 and 13, releasing relays CO and CCO. The release of relay CCO causes the release of relay T whereby conductors 11 and 12 are disconnected from the conductors of line L100, the winding of relay AL is reconnected to the upper conductor of line L100, and the connection from the output terminal of rectifier 15 to the lower conductor of line L100 is again closed thereby to resume charging of battery 99 as hereinbefore described.

Assume next that one of the stations 101, 102, 103 and 104 is called from some other station of the system, a connection to conductors 11, 12 and 13 being effected by operation of a connector switch C1. When the brushes of connector C1 engage the terminals to which conductors 11, 12 and 13 are connected, ground potential is connected through the S brush to conductor 13 causing the operative energization of relays CO and CCO. The operation of relay CO disconnects the windings of line relay L from conductors 11 and 12. The operation of relay CCO opens the battery charging circuit, closes the circuit through resistor 17 and the winding of relay AL and closes the circuit for operating relay T. The operation of relay T opens the circuit through the winding of relay AL and extends the connection from the brushes of connector C1 to the conductors of line L100. Thereafter ringing current is transmitted from the connector C1 over the one or the other of the conductors of line L100 to energize the gas-filled tube of the called station and thereafter operate the ringer of this station. The gas-filled tube 98 is not energized responsive to ringing current transmitted over the lower conductor of line L100 since condenser 96 is a low impedance shunt for the alternating-current component of the ringing voltage. When the called subscriber answers, two-way communication is established between the calling and called stations. When the connection is released, disconnection of ground from the S brush of connector C1 causes the release of relays CO and CCO. The release of relay CCO causes the release of relay T and the charging of battery 99 is resumed.

Calls to and from any one of the stations 201, 202, 203 and 204 connected to line L200 are established in the manner described in the aforementioned Hawks-Van Tassel-Weller application.

The intermittent charging of battery 99 supplies sufficient energy for operating the outlying carrier terminal equipment CT2. In case the rectifier fails to produce the required output voltage, alarm relay M releases, thereby causing energization of the upper winding of relay T; and the operation of relay T disconnects the rectifier output from line L100 and extends the conductors of line L100 to conductors 11 and 12. In this case the auxiliary relay AL is rendered non-operative but the line relay L of line circuit LC1 responds directly to the initiation of a call at any one of stations 101, 102, 103 and 104.

The invention is not limited to the type of telephone system or the type of switching means shown but is generally applicable to any system comprising subscriber lines and switching means for interconnecting calling and called lines.

What is claimed is:

1. In a telephone system comprising subscriber lines and central office switching means for establishing communication connections between calling and called lines, line circuit means including a control conductor individual to each of said subscriber lines, means for connecting a busy marking potential to the control conductor of a line, a carrier terminal equipment remote from said switching means connected to one of said lines, said equipment including a storage battery supplying energy for operating said terminal equipment, a direct-current voltage source, means including said one line normally connecting said direct-current voltage source to said carrier terminal equipment for charging said battery, a gas-filled tube and a relay in said equipment, said tube energized by connection of said voltage source to said terminal to operate said relay, thereby to extend the connection from said voltage source to said battery, and means included in the line circuit means of said one line operatively responsive to connection of busy marking potential to the control conductor for disconnecting said direct-current voltage source from said one line.

2. In a telephone system according to claim 1, means comprising said relay in said carrier terminal equipment effective upon disconnection of said direct-current voltage source from said one line for disconnecting said battery from said one line.

3. In a telephone system comprising subscriber lines and central office switching means for establishing communication connections between calling and called lines, line circuit means including a control conductor individual to each of said lines, means for connecting a busy marking potential to the control conductor of a line, a storage battery, a direct-current voltage source for charging said battery, means for connecting said source to one of said lines, a voltage sensitive device, a relay having a winding connected in series with said one line and said device, said device effective upon connection of said source to said one line to close a direct-current circuit from said source through the winding of said relay thereby operatively energizing the relay, means comprising contacts closed by operation of said relay for connecting said source through said line in series with said battery thereby to effect charging of said battery, and means including means operatively responsive to connection of said marking potential to the control conductor of said one line for disconnecting said source and said battery from said one line.

4. In a telephone system comprising subscriber lines and central office switching means for establishing communication connections between calling and called lines, line circuit means including a line relay and a control conductor individual to each of said lines, means for connecting a busy marking potential to the control conductor of a line, a storage battery, a direct-current voltage source for charging said battery, a relay for connecting said battery to one of said lines, a gas-filled tube connected in series with the winding of said relay to said one line, the line circuit means of said one line including relay means normally connecting said source to said one line, said tube effective responsive to the connection of said source thereto to cause the operative energization of said relay, contact means actuated by operation of said relay connecting said battery in series with said line to said source thereby to charge said battery, a subscriber station connected to said one line, an auxiliary line relay normally connected to said line for operation upon removal of the telephone at said station to initiate a call, and means including relay means operatively responsive to connection of busy marking potential to the control conductor of said one line for disconnecting said source from said one line, for disconnecting said auxiliary relay from said one line and for connecting said one line to the windings of said line relay.

References Cited in the file of this patent

UNITED STATES PATENTS

| | | |
|---|---|---|
| 1,412,435 | Wicks | Apr. 11, 1922 |
| 1,848,196 | Polinkowsky et al. | Mar. 8, 1932 |